United States Patent
Komatsu et al.

(10) Patent No.: US 10,150,078 B2
(45) Date of Patent: Dec. 11, 2018

(54) AMOUNT OF SEAWATER CONTROL DEVICE FOR SCRUBBER, AMOUNT OF SEAWATER CONTROL METHOD FOR SCRUBBER, AND AMOUNT OF ALKALI CONTROL DEVICE AND AMOUNT OF ALKALI CONTROL METHOD

(71) Applicant: FUJI ELECTRIC CO., LTD., Kawasaki-shi (JP)

(72) Inventors: Tadashi Komatsu, Tokyo (JP); Kuniyuki Takahashi, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 642 days.

(21) Appl. No.: 14/680,047

(22) Filed: Apr. 6, 2015

(65) Prior Publication Data
US 2015/0209720 A1    Jul. 30, 2015

Related U.S. Application Data

(63) Continuation of application No. PCT/JP2014/051672, filed on Jan. 27, 2014.

(30) Foreign Application Priority Data

Jan. 29, 2013 (JP) .................................. 2013-014316
Jan. 29, 2013 (JP) .................................. 2013-014317

(51) Int. Cl.
*B01D 46/46* (2006.01)
*B01D 53/18* (2006.01)
(Continued)

(52) U.S. Cl.
CPC ....... *B01D 53/185* (2013.01); *B01D 53/1412* (2013.01); *B01D 53/507* (2013.01);
(Continued)

(58) Field of Classification Search
None
See application file for complete search history.

(56) References Cited

U.S. PATENT DOCUMENTS 5,690,899 A     11/1997 Makkinejad et al.
2001/0050171 A1*  12/2001 Myers .................. B01D 53/501
                                                                166/267

FOREIGN PATENT DOCUMENTS

| EP | 0696842 A1 * | 2/1996 | ......... F04D 15/0066 |
| EP | 0756890 A2 | 2/1997 | |
| EP | 2295130 A1 | 3/2011 | |

(Continued)

OTHER PUBLICATIONS

Translation of EP-0696842-A1, accessed Jan. 5, 2018.*

*Primary Examiner* — Amber R Orlando
*Assistant Examiner* — Phillip Y Shao
(74) *Attorney, Agent, or Firm* — Rabin & Berdo, P.C.

(57) ABSTRACT

An amount of seawater control device controls an amount of seawater supplied to a scrubber that purifies sulfur oxide contained in exhaust gas by bringing the sulfur oxide into contact with seawater. The control device includes a minimum amount of seawater converter which calculates a minimum amount of seawater necessary for an absorption reaction of the sulfur oxide by the seawater, an amount of seawater correction converter which calculates a corrected amount of seawater which is an amount of seawater at which the sulfur oxide contained in the exhaust gas discharged into atmosphere from the scrubber is equal to or less than a set variable, a summing element which calculates a set amount of seawater by summing the minimum amount of seawater and the corrected amount of seawater, and a pump control device which implements control such that seawater corresponding to the set amount is supplied to the scrubber.

13 Claims, 11 Drawing Sheets

(51) Int. Cl.
  B01D 53/50 (2006.01)
  G05D 9/12 (2006.01)
  B01D 53/14 (2006.01)
  G05D 7/06 (2006.01)

(52) U.S. Cl.
  CPC ............. G05D 7/0682 (2013.01); G05D 9/12 (2013.01); B01D 53/501 (2013.01); B01D 2251/304 (2013.01); B01D 2252/1035 (2013.01); B01D 2258/0283 (2013.01); Y10T 137/0324 (2015.04); Y10T 137/86027 (2015.04)

(56) References Cited

U.S. PATENT DOCUMENTS

| | | |
|---|---|---|
| 2015/0209720 A1 | 7/2015 | Komatsu et al. |
| 2016/0317968 A1 | 11/2016 | Takahashi et al. |

FOREIGN PATENT DOCUMENTS

| | | |
|---|---|---|
| EP | 2574393 A1 | 4/2013 |
| JP | H03-288523 A | 12/1991 |
| JP | H09-173769 A | 7/1997 |
| JP | 11244646 A | 9/1999 |
| JP | 2993891 B | 12/1999 |
| JP | 2004-081933 A | 3/2004 |
| JP | 2005-066505 A | 3/2005 |
| JP | 2007-051555 A | 3/2007 |
| JP | 2011-524800 A | 9/2011 |
| JP | 2012-179521 A | 9/2012 |
| WO | WO 2012-117586 A1 | 9/2012 |
| WO | WO-2014-119513 A1 | 8/2014 |

\* cited by examiner

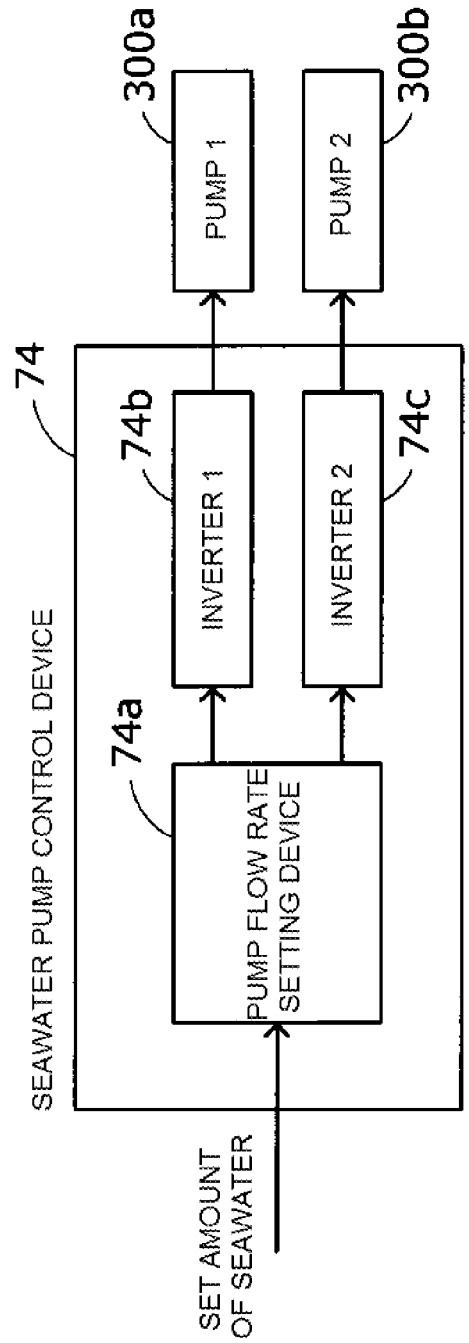

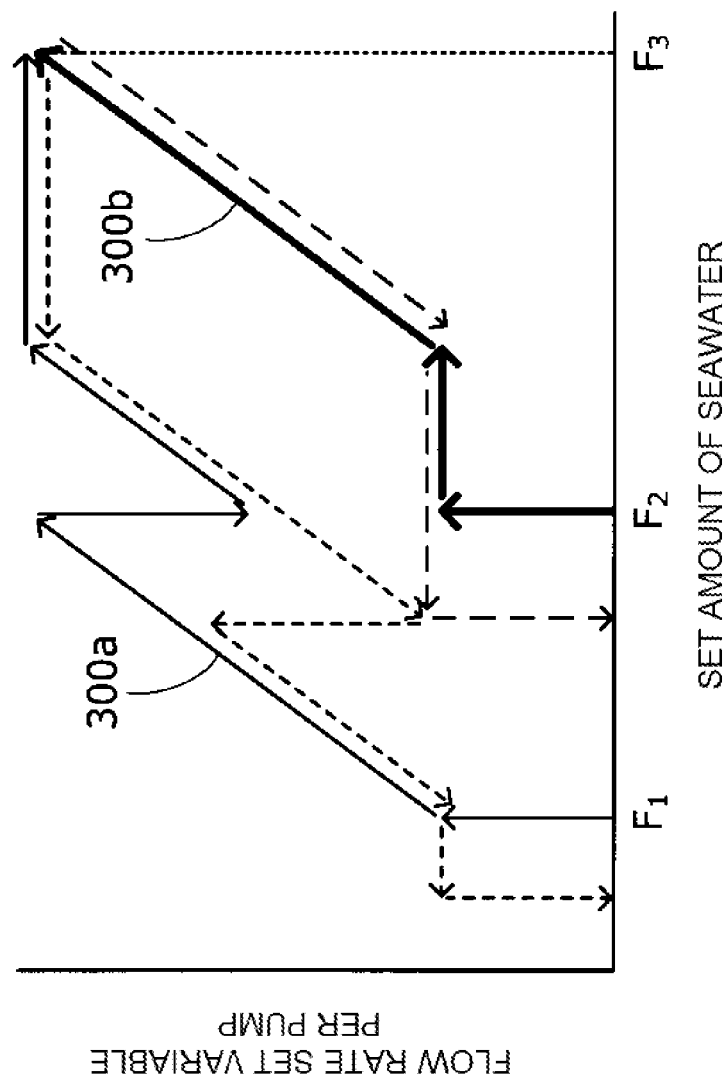

AMOUNT OF SEAWATER CONTROL DEVICE FOR SCRUBBER, AMOUNT OF SEAWATER CONTROL METHOD FOR SCRUBBER, AND AMOUNT OF ALKALI CONTROL DEVICE AND AMOUNT OF ALKALI CONTROL METHOD

This application is a continuation under 35 U.S.C. 120 of International Application PCT/JP2014/051672 having the International Filing Date of Jan. 27, 2014, and having the benefit of the earlier filing dates of Japanese Application No. 2013-014316, filed Jan. 29, 2013, and Japanese Application No. 2013-014317, filed Jan. 29, 2013. All of the identified applications are fully incorporated herein by reference.

TECHNICAL FIELD

The present invention relates to an amount of seawater control device for seawater which is supplied as an absorbing liquid to a scrubber for reducing the concentration of sulfur oxides in the exhaust gas (and in particular, sulfur dioxide ($SO_2$)), and a control device for an amount of alkali which is injected into seawater which is supplied as an absorbing liquid.

BACKGROUND ART

The International Maritime Organization (IMO), as part of a policy of incrementally strengthening sulfur content restrictions in fuel oil in order to reduce sulfur oxides (SOx) contained in the exhaust gases of ships, has finally imposed a restriction of no more than 0.5% sulfur content, applicable to all sea areas. Therefore, ship operators need to take measures such as using low-sulfur-content fuel, or installing an exhaust gas processing device in the main engine, or the like.

A scrubber which reduces the concentration of harmful material in the exhaust gas by passing the exhaust gas through seawater is known as an exhaust gas processing device for a ship (see, for example, Patent Document 1 and Patent Document 2).

Patent Document 1: Japanese Patent Application Publication No. 2004-081933
Patent Document 2: Japanese Patent No. 2993891

As regards the amount of sea water supplied to the scrubber, an amount of seawater suited to the amount of sulfur oxide to be treated must be injected, and if an excessive amount of seawater is supplied, then there is a problem in that the pressure loss becomes greater, and the drive power of the seawater pump increases, whereas if the amount of seawater is insufficient, then there is a problem in that the concentration of sulfur oxides in the exhaust gas exceeds the limit value.

The present invention was devised in view of these circumstances, an object thereof being to provide an amount of seawater control device for a scrubber which is capable of achieving stable operation by supplying a suitable amount of seawater to the scrubber, in such a manner that the sulfur oxide concentration in the exhaust gas after processing never exceeds a limit value.

Furthermore, in the exhaust gas processing device disclosed in Patent Document 2, pH control is applied to the liquid bottoms of an absorption tower constituting a scrubber, and the exhaust gas is cleaned by recycling cleaning liquid from the bottom of the absorption tower. In general, a glass electrode system is used for a pH meter used in pH measurement, but a pH meter of this kind requires periodic cleaning and calibration, and it has been difficult to control the pH precisely on the basis of stable measurement results.

The present invention was devised in view of these circumstances, an object thereof being to provide an amount of alkali control device whereby it is possible to obtain a stable and highly reliable sulfur oxide removal rate, by applying alkali control of the seawater which is supplied to a scrubber, without using a pH meter.

SUMMARY

The present invention is an amount of seawater control device for a scrubber, which controls an amount of seawater supplied to a scrubber that purifies sulfur oxide contained in exhaust gas by bringing the sulfur oxide into contact with seawater, comprising: a minimum amount of seawater converter which calculates a minimum amount of seawater which is a minimum amount of seawater necessary for an absorption reaction of the sulfur oxide by the seawater, from an engine output and a sulfur content of fuel oil; an amount of seawater correction converter which calculates a corrected amount of seawater which is an amount of seawater at which the sulfur oxide contained in the exhaust gas discharged into atmosphere from the scrubber is equal to or less than a set variable; a summing element which calculates a set amount of seawater by summing the minimum amount of seawater and the corrected amount of seawater; and a pump control device which implements control such that seawater corresponding to the set amount of seawater is supplied to the scrubber.

According to the amount of seawater control device for a scrubber described above, the alkali content required to neutralize the sulfur oxides contained in the consumed heavy oil is calculated as a minimum amount of seawater, from the engine output and the sulfur content in the heavy oil used, and moreover, a corrected amount of seawater is calculated in such a manner that the sulfur oxide concentration contained in the processed exhaust gas which is discharged into the atmosphere from the scrubber does not exceed the emission limit value, and a set amount of seawater obtained by summing together these two amounts is supplied to the scrubber. By this configuration, it is possible to achieve stable operation by supplying an appropriate amount of seawater to the scrubber, in such a manner that the sulfur oxide concentration in the exhaust gas after processing does not exceed the limit value, without the amount of seawater supplied to the scrubber being excessive or insufficient.

The amount of alkali control device according to the present invention is an amount of alkali control device, which controls an amount of alkali injected into seawater supplied to a scrubber that purifies sulfur oxide contained in exhaust gas by bringing the sulfur oxide into contact with seawater, comprising: a minimum amount of seawater converter which calculates a minimum amount of seawater which is a minimum amount of seawater necessary for an absorption reaction of the sulfur oxide by the seawater, from an engine output and a sulfur content of fuel oil; an amount of seawater correction converter which calculates a corrected amount of seawater which is an amount of seawater at which the sulfur oxide contained in the exhaust gas discharged into atmosphere from the scrubber is equal to or less than a set variable; a summing element which calculates a set amount of seawater by summing the minimum amount of seawater and the corrected amount of seawater; a pump control device which implements control such that seawater corresponding to the set amount of seawater is supplied to the scrubber; an amount of alkali calculator which calculates an alkali injection amount from an amount of an alkali component which is contained in seawater corresponding to the set amount of seawater; and an alkali pump control device which implements control in such a manner that an alkali agent corresponding to the alkali injection amount is injected into the seawater which is supplied to the scrubber.

According to the amount of alkali control device described above, the alkali content required to neutralize the sulfur oxides contained in the consumed heavy oil is calculated as a minimum amount of seawater, from the engine output and the sulfur content in the heavy oil used, and moreover, a corrected amount of seawater is calculated in such a manner that the sulfur oxide concentration contained in the processed exhaust gas which is discharged into the atmosphere from the scrubber does not exceed the emission limit value, and an alkali injection amount to be injected into the seawater is calculated on the basis of a set amount of seawater obtained by summing together the minimum amount of seawater and the corrected amount of seawater. By adopting this configuration, it is possible to control the alkali in the seawater supplied to the scrubber, without measuring the pH of the seawater, in other words, without using a pH meter, and therefore it is possible to obtain a stable and highly reliable rate of removal of the sulfur oxides.

According to the present invention, it is possible to achieve stable operation by supplying a suitable amount of seawater to the scrubber, in such a manner that the sulfur oxide concentration in the exhaust gas after processing never exceeds a limit value.

Furthermore, according to the present invention, the alkali in seawater supplied to the scrubber is controlled without using a pH meter, and therefore it is possible to obtain a stable and highly reliable rate of removal of the sulfur oxide.

BRIEF DESCRIPTION OF THE DRAWINGS

FIG. 10 is a block diagram showing a configuration in a case where a pump control device relating to the second embodiment is provided with an inverter; and FIG. 11 is a diagram showing a relationship between a flow rate set variable per pump, and a set amount of seawater, in a case where a plurality of pumps relating to the second embodiment is provided.

DETAILED DESCRIPTION

Below, a first embodiment of the present invention is described in detail with reference to the accompanying drawings.

Figure 1:
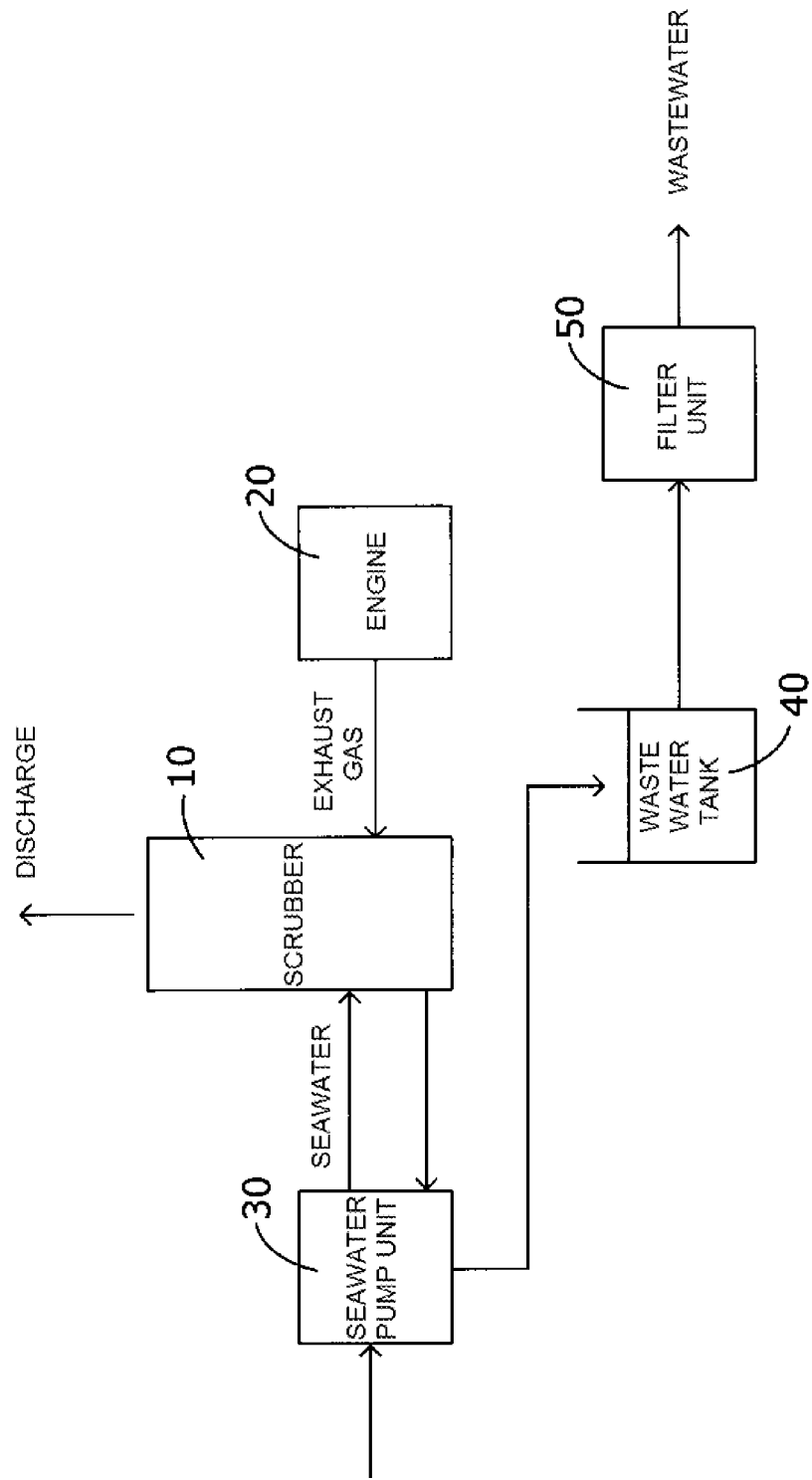
FIG. 1 is an illustrative diagram showing an exhaust gas processing system centered on a scrubber relating to a first embodiment.

FIG. 1 is an illustrative diagram showing an exhaust gas processing system centered on a scrubber relating to a first embodiment. The exhaust gas processing system relating to the present embodiment contemplates a system which removes sulfur dioxide ($SO_2$) included in exhaust gas discharged from an engine which is used in a ship. The invention is not limited to this, however, and the exhaust gas processing system relating to the present embodiment can be applied to processing of various exhaust gases including substances such as nitrogen oxide (NOx), sulfur oxide (SOx), and the like.

As shown in FIG. 1, the exhaust gas processing system is principally configured by a scrubber 10 which receives a supply of exhaust gas from the engine 20, a seawater pump unit 30 provided with a seawater pressurization pump and a seawater suction pump, a wastewater tank 40, and a filter unit 50 for filtering the wastewater.

The exhaust gas discharged from the engine 20 is introduced into the scrubber 10. This exhaust gas contains 50 to 1500 ppm of sulfur dioxide (SO2). As this exhaust gas rises up inside the scrubber 10, seawater that has been introduced into the scrubber 10 is sprayed via the seawater pump unit 30, and a gas-liquid contact is created.

The sulfur dioxide ($SO_2$) in the exhaust gas is dissolved in the seawater and separated into hydrogen ions and sulfurous acid ions, as shown in Formula (1) below.

[Chemical Formula 1]

$$SO_2 + H_2O \rightarrow H^+ + HSO_3^- \tag{1}$$

The hydrogen ions react with the alkali component ($NaHCO_3$) in the seawater, as indicated in Formula (2) below.

[Chemical Formula 2]

$$H^+ + HSO_3^- + Na^+ + HCO_3^- \rightarrow Na^+ + HSO_3^- + H_2O + CO_2 \tag{2}$$

The sulfurous acid ions are oxidized to become sulfuric acid ions by air, as indicated in Formula (3) below.

[Chemical Formula 3]

$$Na^+ + HSO_3^- + Na^+ + HCO_3^- + \tfrac{1}{2}O_2 \rightarrow 2Na^+ + SO_4^{2-} + H_2O + CO_2 \tag{3}$$

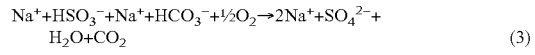

If the alkali component in the seawater required for the reactions in Formulas (2) and (3) is insufficient, then the hydrogen ion index (pH) in the seawater falls due to increase in the hydrogen ions, and the absorption reaction of the sulfurous acid ions is impeded. Consequently, the minimum amount of seawater required for the absorption reaction of the sulfur dioxide ($SO_2$) by the seawater is determined by the amount which satisfies the reactive component with the alkali component indicated in Formulas (2) and (3). Seawater has a degree of alkalinity of approximately 105 ppm converted to $CaCO_3$.

The exhaust gas from which the sulfur dioxide ($SO_2$) has been removed in this way is discharged into the atmosphere from the top of the scrubber 10.

The seawater sprayed inside the scrubber 10 drops down under its own weight along the inner circumferential surface of the scrubber 10, and collects in a collecting section below the scrubber 10. The collected seawater is discharged to the wastewater tank 40 via the seawater pump unit 30, and is then filtered by the filter unit 50 and discharged into the sea.

Figure 2:
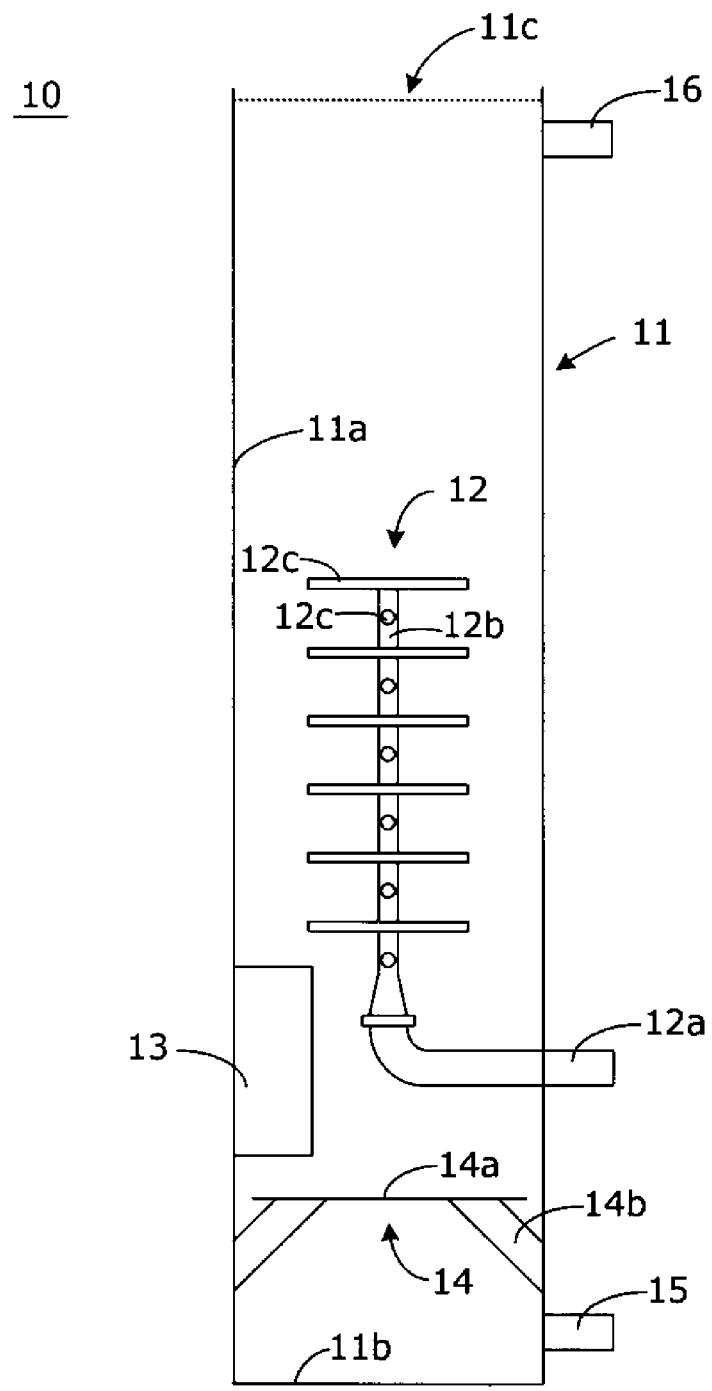
FIG. 2 is a cross-sectional schematic drawing of a scrubber.

Next, the configuration of the scrubber 10 will be described. FIG. 2 is a cross-sectional schematic drawing showing an example of a scrubber 10.

As shown in FIG. 2, the scrubber 10 is provided with: a scrubber main body 11 having an internal space in the up/down direction; a spray apparatus 12 which injects (sprays) seawater (liquid) in the form of a mist in a prescribed region in the up/down direction of the internal space of the scrubber main body 11; a gas supply apparatus 13 which introduces engine exhaust gas (gas) into the scrubber main body 11 from a position below the region where the spray apparatus 12 sprays seawater; and a baffle 14 which is provided at a position below the spray apparatus 12. Here, the spray apparatus 12 is connected to the seawater pump unit 30 shown in FIG. 1, and the gas supply apparatus 13 is connected to the engine 20 shown in FIG. 1.

The scrubber main body 11 is constituted by a round cylindrical perimeter wall section 11a and a circular bottom wall section 11b. The perimeter wall section 11a is formed with the same diameter in all parts. The upper end portion of the perimeter wall section 11a is open and an opening section 11c is formed therein. In the present embodiment, the scrubber main body 11 has a round cylindrical shape, but the shape of the scrubber main body 11 is not limited to this and may be a square cylinder shape, for example.

The spray apparatus 12 is disposed on the central axis of the scrubber main body 11. The spray apparatus 12 is constituted by a water supply pipe 12a which is inserted inside the scrubber main body 11 from outside the scrubber main body 11 and which extends to a central position of the scrubber main body 11, a water conduit pipe 12b forming a trunk pipe which is coupled to the inserted end portion of the water supply pipe 12a and extends to a prescribed region, in the up/down direction, of the internal space of the scrubber main body 11, branch pipes 12c which are coupled to the water conduit pipe 12b and extend toward the perimeter wall section 11a of the scrubber main body 11, and spray nozzles (not illustrated) which are provided respectively at the front end of the each branch pipes 12c and which spray liquid supplied from the branch pipes 12c in a prescribed region. The branch pipes 12c are disposed in a plurality of levels in the up/down direction, and are also arranged so that branch pipes 12c that are mutually adjacent in the up/down direction intersect with each other.

The gas supply apparatus 13 is provided in such a manner that the gas spraying direction is aligned with the tangential direction of the perimeter wall section 11a of the scrubber main body 11. Consequently, the exhaust gas introduced from the gas supply apparatus 13 is injected in a horizontal direction along the inner circumferential surface of the perimeter wall section 11a.

The baffle 14 is constituted by a circular disk section 14a, and leg sections 14b which couple the circular disk section 14a with the perimeter wall section 11a of the scrubber main body 11. A gap for liquid droplets to flow through is formed between the outer circumferential portion of the circular disk section 14a and the perimeter wall section 11a of the scrubber main body 11. The baffle 14 divides the interior of the scrubber main body 11 into a region where liquid is sprayed by the spray apparatus 12 and a region where liquid is collected for drainage to the outside of the scrubber main body 11. A wastewater pipe 15 for discharging liquid to outside the scrubber main body 11 is provided below the baffle 14.

An exhaust pipe 16 for extracting a portion of the processed exhaust gas to the outside of the scrubber main body 11 is provided in the vicinity of the opening section 11c of the scrubber main body 11. The exhaust pipe 16 is connected to an analyzer for sampling the processed exhaust gas.

The exhaust gas processing in the scrubber 10 which is configured in this way will now be described. Exhaust gas discharged from an engine is introduced by the gas supply apparatus 13 at a position below the region where the spray apparatus 12 sprays liquid. This exhaust gas rises up inside the scrubber main body 11 while revolving so as to follow the perimeter wall section 11a.

Meanwhile, seawater is introduced into the water conduit pipe 12b via the water supply pipe 12a. The seawater is then sprayed towards the perimeter wall section 11a of the scrubber main body 11, from the spray nozzles which are provided at the front ends of the plurality of levels of branch pipes 12c.

Consequently, the exhaust gas which rises up while revolving inside the scrubber main body 11 makes gas/liquid contact with the seawater sprayed from the spray nozzles provided on the branch pipes 12c which are provided in the respective levels, and the sulfur dioxide ($SO_2$) in the exhaust gas is absorbed and removed. The exhaust gas from which the sulfur dioxide ($SO_2$) has been removed is discharged into the atmosphere from the opening section 11c provided in the upper portion of the scrubber main body 11. Furthermore, a portion of the exhaust gas is sent to an analyzer via the exhaust pipe 16.

The seawater which forms into liquid droplets is pressed against the perimeter wall section 11a by the centrifugal force of the revolving flow and falls under its own weight. The droplets that drop down are prevented from revolving by the baffle 14 which is disposed below the scrubber main body 11, and then pass along the baffle 14 and the perimeter wall section 11a, and collect in the collecting section which is constituted by the bottom wall section 11b and the perimeter wall section 11a peripheral to same, of the scrubber main body 11. The collected liquid is discharged to the outside of the scrubber main body 11 via the wastewater pipe 15.

Figure 3:
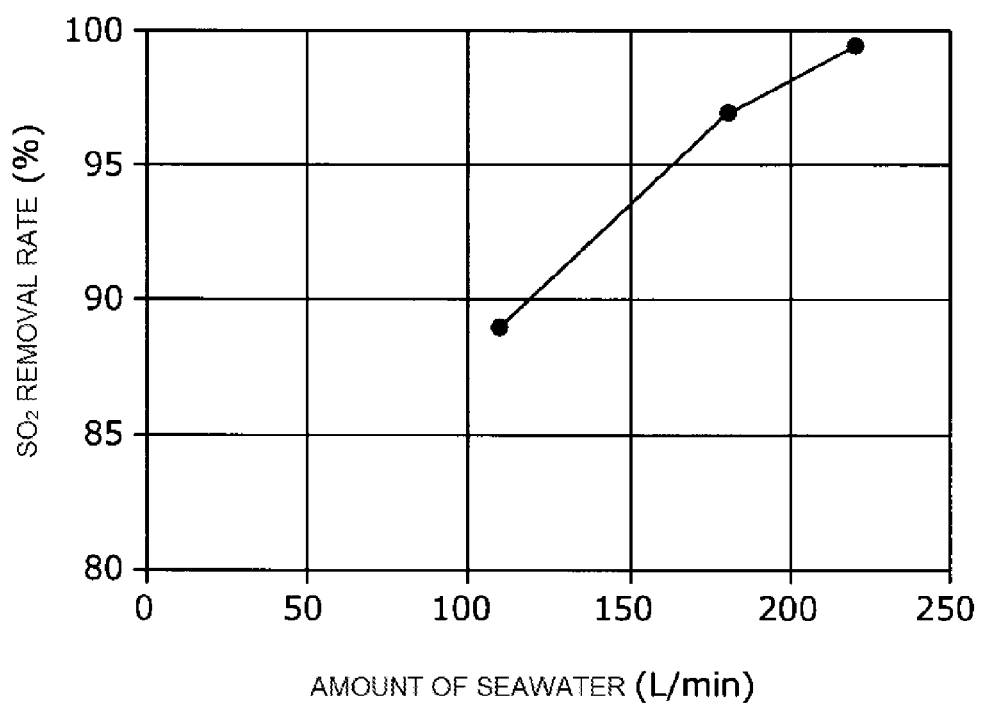
FIG. 3 is a graph showing the relationship between the amount of seawater supplied to the scrubber and the rate of removal of the sulfur dioxide ($SO_2$)

FIG. 3 is a graph showing the relationship between the amount of seawater supplied to the scrubber 10 and the rate of removal of the sulfur dioxide ($SO_2$). In FIG. 3, the horizontal axis indicates the amount of seawater (liters/min) and the vertical axis indicates the rate of removal of sulfur dioxide (%).

As shown in FIG. 3, the further the amount of seawater supplied to the scrubber 10 is raised, and the greater the amount of seawater sprayed by the spray apparatus 12, the greater the increase in the rate of removal of the sulfur dioxide ($SO_2$). This is because the surface area of the liquid droplets increases when the sprayed amount of seawater is increased, and hence the contact surface area between the exhaust gas and the seawater becomes greater.

Due to the relationship between the amount of seawater and the rate of removal of sulfur dioxide ($SO_2$) shown in FIG. 3, when the exhaust gas which is discharged into the atmosphere from the opening section 11c of the scrubber main body 11 contains a high concentration of sulfur dioxide ($SO_2$) (high outlet $SO_2$ concentration), then it is possible to reduce the outlet $SO_2$ concentration by increasing the amount of seawater sprayed by the spray apparatus 12.

Figure 4:
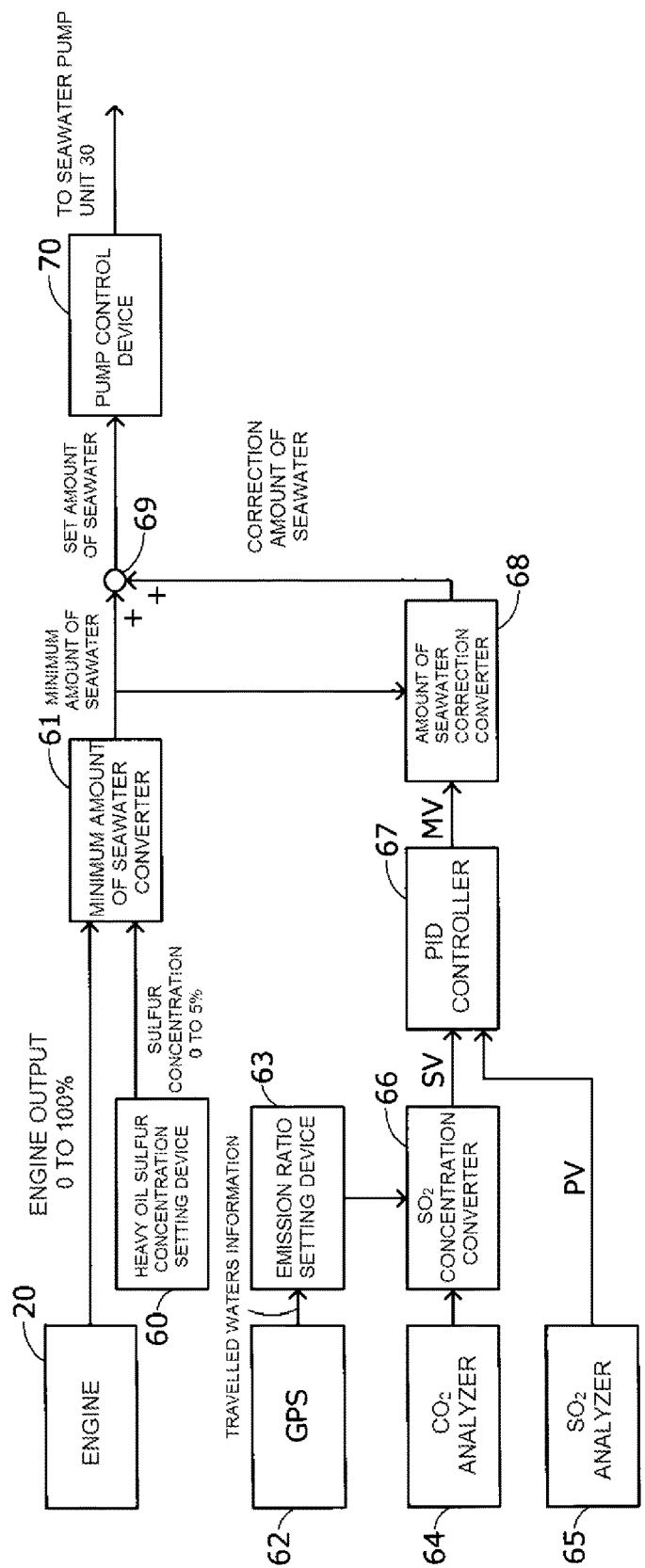
FIG. 4 is a block diagram showing the configuration of an amount of seawater control system in the exhaust gas processing system relating to a first embodiment.

Next, the control of the amount of seawater supplied to the spray apparatus 12 of the scrubber 10 will be described. FIG. 4 is a block diagram showing the configuration of an amount of seawater control system in the exhaust gas processing system relating to the present embodiment.

As shown in FIG. 4, the amount of seawater control system is provided with a heavy oil sulfur concentration setting device 60, an minimum amount of seawater converter 61, a GPS 62, an emission ratio setting device 63, a $CO_2$ analyzer 64, an $SO_2$ analyzer 65, an $SO_2$ concentration converter 66, a PID (proportional, integral and derivative) controller 67, an amount of seawater correction converter 68, a summing element 69, and a pump control device 70.

The configuration and operation of the amount of seawater control system of this kind is described here.

The amount of seawater control system includes a minimum amount of seawater converter 61 which calculates a minimum amount of seawater, an amount of seawater correction converter 68 which calculates a corrected amount of seawater, and a pump control device 70 which controls the seawater pump unit 30 (see FIG. 1) so as to supply a set amount of seawater obtained by adding together these amounts, to the scrubber 10.

The output value of the engine 20 and the set variable of the heavy oil sulfur concentration setting device 60 is input to the minimum amount of seawater converter 61. The output value of the engine 20 is the output of the ship engine (from 0% to 100%). The set variable of the heavy oil sulfur concentration setting device 60 is the sulfur content of the fuel oil (heavy oil) used by ships (0% to 5%).

Correlation data between the output of the engine 20 employed and the heavy oil consumption is previously input to the minimum amount of seawater converter 61, and when the output value of the engine 20 is input, this is converted to a heavy oil consumption amount. The minimum amount of seawater converter 61 then calculates the minimum amount of seawater by multiplying the heavy oil consumption amount, the sulfur content of the heavy oil, which is the set variable of the heavy oil sulfur concentration setting device 60, and a conversion coefficient. The minimum amount of seawater indicates the minimum amount of seawater required in the absorption reaction of the sulfur dioxide ($SO_2$) by the seawater, which is indicated in Formulas (1) to (3) above.

The GPS 62 measures the current position of the ship and outputs information about the waters being travelled based on this position, to the emission ratio setting device 63. The emission ratio setting device 63 outputs the emission ratio of sulfur dioxide ($SO_2$) in the waters, to the $SO_2$ concentration converter 66, on the basis of the travelled waters information input manually or by a signal from a GPS 62.

Here, the emission ratio is a numerical value determined by the sulfur content in the fuel. Furthermore, the sulfur content in the fuel is confirmed by measuring the emission ratio of carbon dioxide ($CO_2$) and sulfur dioxide ($SO_2$) in the exhaust gas.

The $CO_2$ analyzer 64 measures the concentration of the $CO_2$ contained in the processed exhaust gas discharged into the atmosphere from the scrubber 10 (the outlet $CO_2$ concentration). The output value of the $CO_2$ analyzer 64 is input to the $SO_2$ concentration converter 66. The $SO_2$ concentration converter 66 calculates the $SO_2$ concentration (ppm) to be purified by multiplying the emission ratio by the outlet $CO_2$ concentration (%), and calculates the set variable (SV) of the outlet $SO_2$ concentration by further multiplying by a safety ratio of 0.8. This set variable (SV) of the outlet $SO_2$ concentration is output to the PID controller 67 from the $SO_2$ concentration converter 66.

For instance, in waters where the sulfur content in the fuel is restricted to 0.1%, the designated emission ratio is 4.3. When the outlet $CO_2$ concentration measured by the $CO_2$ analyzer 64 is 5%, then the $SO_2$ concentration should be purified to no more than 21.5 ppm (=4.3×5), and by multiplying this value by a safety ratio of 0.8, an outlet $SO_2$ concentration set variable of 17.2 ppm is obtained.

The $SO_2$ analyzer 65 measures the concentration of $SO_2$ contained in the processed exhaust gas discharged into the atmosphere from the scrubber 10 (the outlet $SO_2$ concentration). This process variable (PV) of the outlet $SO_2$ concentration is output to the PID controller 67 from the $SO_2$ analyzer 65.

The PID controller 67 calculates the manipulative variable (MV) by carrying out a PID control calculation on the basis of the deviation of the outlet $SO_2$ concentration set variable which is input as an SV value and the outlet $SO_2$ concentration set variable which is input as a PV value, and the MV is output to the amount of seawater correction converter 68. The PID controller 67 has a function for responding by switching between automatic and manual, in respect of the input or output of the SV value, the PV value or the MV value. Consequently, when an input is not obtained from the $SO_2$ analyzer 65, for example, due to a fault or maintenance, or the like, then it is possible to respond by switching from automatic input to manual input.

The amount of seawater correction converter 68 sets the manipulative variable (MV) which is the output of the PID controller 67, to an amount of seawater correction value proportionate to the minimum amount of seawater, and calculates a corrected amount of seawater. For example, if the minimum amount of seawater calculated by the minimum amount of seawater converter 61 is 100 t/h, the MV value is 100% and the proportional constant is 0.5, then the amount of seawater correction converter 68 calculates a corrected amount of seawater of 50 t/h. The proportional constant may be given as a variable value in relation to the minimum amount of seawater, rather than a fixed value.

In the summing element 69, the set amount of seawater is calculated by summing the minimum amount of seawater calculated by the minimum amount of seawater converter 61, and the corrected amount of seawater calculated by the amount of seawater correction converter 68. The set amount of seawater calculated by the summing element 69 is input to the pump control device 70. The pump control device 70 controls the seawater pump unit 30 and supplies seawater of this set amount of seawater to the scrubber 10.

The actual amount of seawater supplied from the seawater pump unit 30 to the scrubber 10 can be measured by installing a flow meter in the seawater pump unit 30. In this case, feedback control may be carried out, by comparing the actual amount of seawater measured by the pump control device 70 with the set amount of seawater. However, even if the outlet $SO_2$ concentration in the scrubber 10 has risen due to an insufficiency in the actual amount of seawater supplied to the scrubber 10 from the seawater pump unit 30, the corrected amount of seawater is guided in an increasing direction by the PID controller 67 in the amount of seawater control system.

The pump for supplying seawater to the scrubber 10 may be a single pump or a plurality of pumps. If a plurality of pumps is provided, the plurality of pumps may be controlled by the pump control device 70 in such a manner that the number of operating pumps is raised in accordance with increase in the set amount of seawater, and the number of operating pumps is reduced in accordance with decrease in the set amount of seawater.

Figure 5:
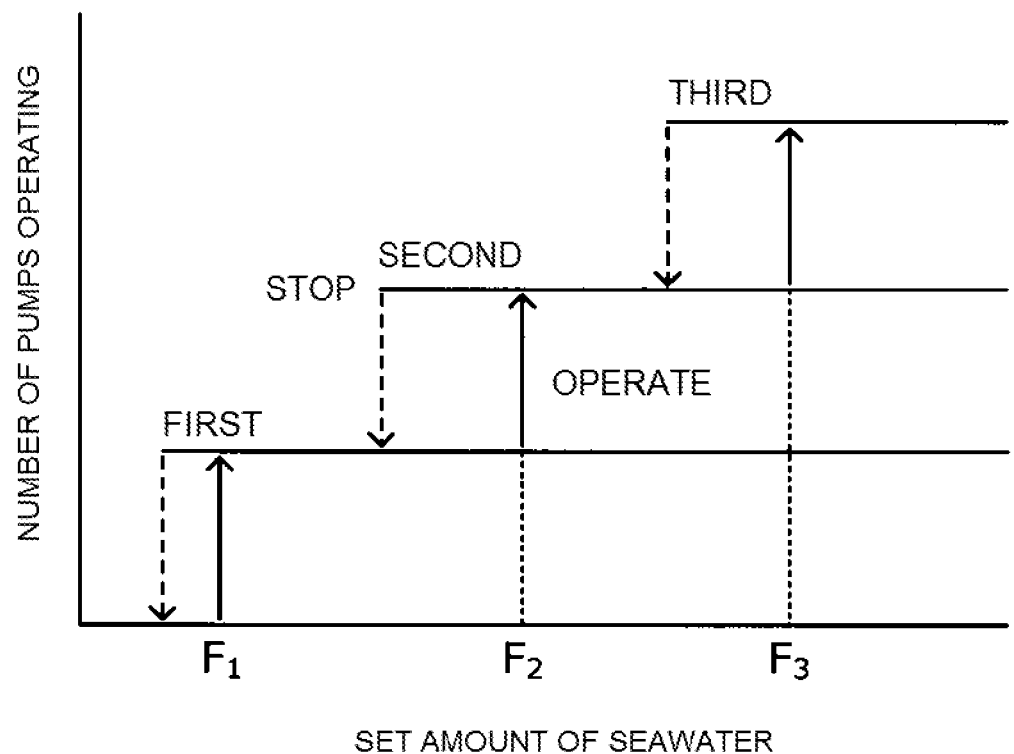
FIG. 5 is a diagram showing a relationship between the number of pumps operating and the set amount of seawater, when a plurality of pumps is provided.

FIG. 5 is a diagram showing a relationship between the number of pumps operating and the set amount of seawater, when a plurality of pumps is provided. In FIG. 5, three pumps for supplying seawater to the scrubber 10 are provided, and the solid line indicates an operating state of the pump, and a broken line indicates a stopped state of the pump. As shown in FIG. 5, when the set amount of seawater is between ($F_1$) and ($F_2$), only one pump operates, and when the set amount of seawater exceeds ($F_2$), a second pump also starts to operate. Moreover, when the set amount of seawater exceeds ($F_3$), then a third pump also starts to operate. Furthermore, when the set amount of seawater decreases below ($F_3$), the third pump stops operation, and when the set amount of seawater decreases below ($F_2$), the second pump stops operation.

When a plurality of pumps are controlled as shown in FIG. 5, in order to avoid frequent repetition of an operating state and a stopped state of the pumps, it is necessary for the PID controller 67 in the amount of seawater control system to be limited to proportionate control, in such a manner that integrated control is not carried out.

Figure 6:
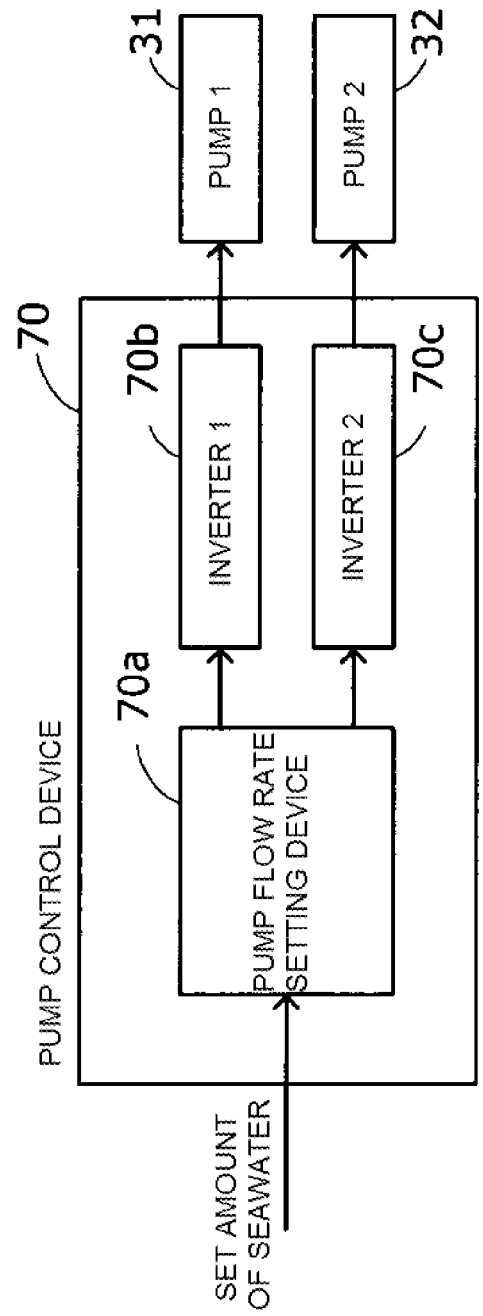
FIG. 6 is a block diagram showing a configuration in a case where a pump control device relating to the first embodiment is provided with an inverter.
Figure 7:
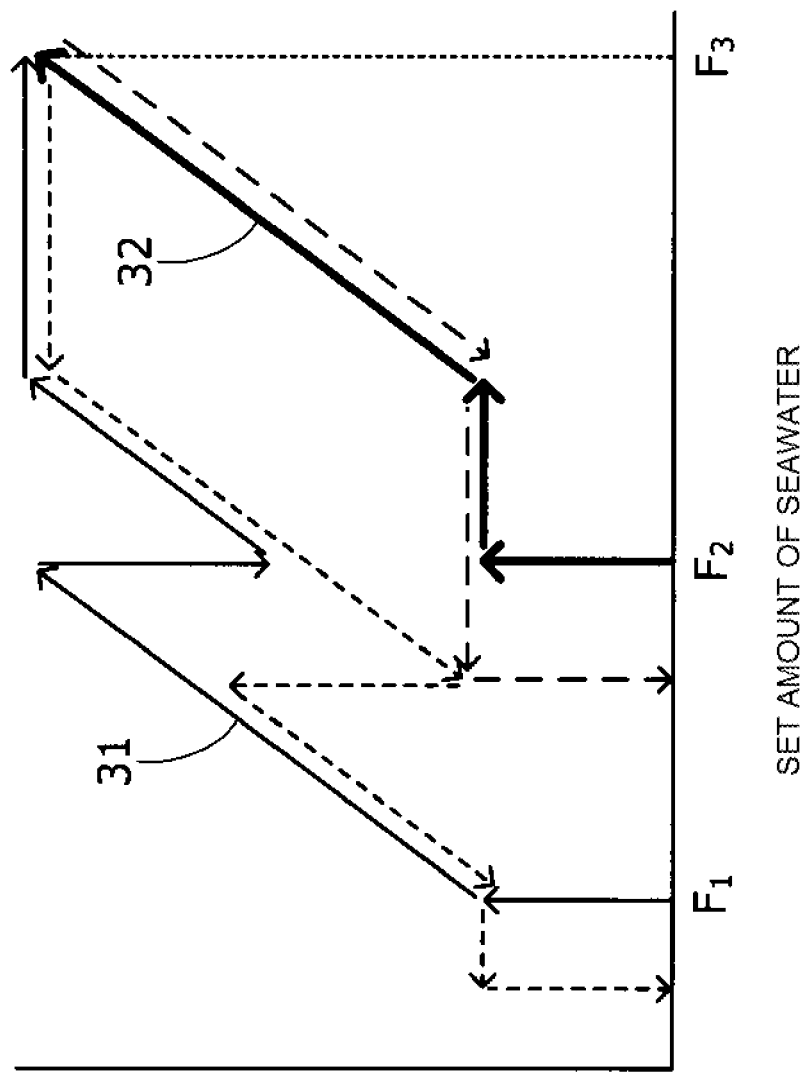
FIG. 7 is a diagram showing a relationship between a flow rate set variable per pump, and a set amount of seawater, in a case where a plurality of pumps relating to the first embodiment are provided.

Furthermore, as shown in FIG. 6 and FIG. 7, it is also possible to adopt a configuration in which a plurality of pumps are controlled by an inverter in the pump control device 70. In this case, it is possible to apply precise pump control, compared to a case where control by an inverter is not implemented.

FIG. 6 is a block diagram showing a configuration of a case where the pump control device 70 is provided with an inverter. For example, when two pumps for supplying seawater to the scrubber 10 are provided, as shown in FIG. 6, the pump control device 70 is provided with a pump flow rate setting device 70a, a first inverter 70b and a second inverter 70c. The pump flow rate setting device 70a sets a flow rate per pump. The first inverter 70b controls a first pump 31, and the second inverter 70c controls a second pump 32.

FIG. 7 is a diagram showing a relationship between the flow rate set variable per pump and the set amount of seawater, according to the configuration shown in FIG. 6. In FIG. 7, a solid line indicates an operating state of a pump, and a broken line indicates a stopped state of a pump.

As shown in FIG. 7, when the set amount of seawater is between ($F_1$) and ($F_2$), only the first pump 31 operates, and the flow rate set variable of the first pump 31 gradually increases as the set amount of seawater increases from ($F_1$) to ($F_2$). When the set amount of seawater exceeds ($F_2$), then the second pump 32 also starts to operate. In this case, the flow rate set variable of the first pump 31 decreases with the operation of the second pump 32. As the set amount of seawater increases from ($F_2$) to ($F_3$), the flow rate set variables in the first pump 31 and the second pump 32 progressively increase.

Furthermore, as the set amount of seawater decreases from ($F_3$), the flow rate set variables in the first pump 31 and the second pump 32 progressively decrease. When the set amount of seawater decreases below ($F_2$), then a second pump 32 stops operating. In this case, the flow rate set variable of the first pump 31 increases with the stopping of operation of the second pump 32.

The control of the plurality of pumps by inverters, which is illustrated in FIG. 6 and FIG. 7, is effective in cases where the possible values of the set amount of seawater are set to a broad range, in other words, cases where the range of the engine load variation and the range of sulfur content of the fuel oil are set to broad ranges, or the like.

The setting devices, converter and PID controller 67 illustrated in FIG. 4 may be configured by a combination of individual apparatuses or may be configured by a programmable logic controller (PLC).

According to the amount of seawater control system of this kind, control is carried out such that the alkali content required to neutralize the sulfur oxides (in particular, sulfur dioxide ($SO_2$)) contained in the consumed heavy oil is calculated as a minimum amount of seawater, from the engine output and the sulfur content in the heavy oil used, and moreover, a corrected amount of seawater is calculated in such a manner that the sulfur oxide concentration contained in the processed exhaust gas which is discharged into the atmosphere from the scrubber 10 does not exceed the emission limit value, and a set amount of seawater obtained by summing together these two amounts is supplied to the scrubber 10. By this configuration, it is possible to achieve stable operation by supplying an appropriate amount of seawater to the scrubber, in such a manner that the sulfur oxide concentration in the exhaust gas after processing does not exceed the limit value, without the amount of seawater supplied to the scrubber 10 being excessive or insufficient.

Below, a second embodiment of the present invention is described in detail with reference to the accompanying drawings. In the second embodiment, constituent elements which are common with the first embodiment are labelled with the same reference numerals and illustration and description thereof is omitted.

Figure 8:
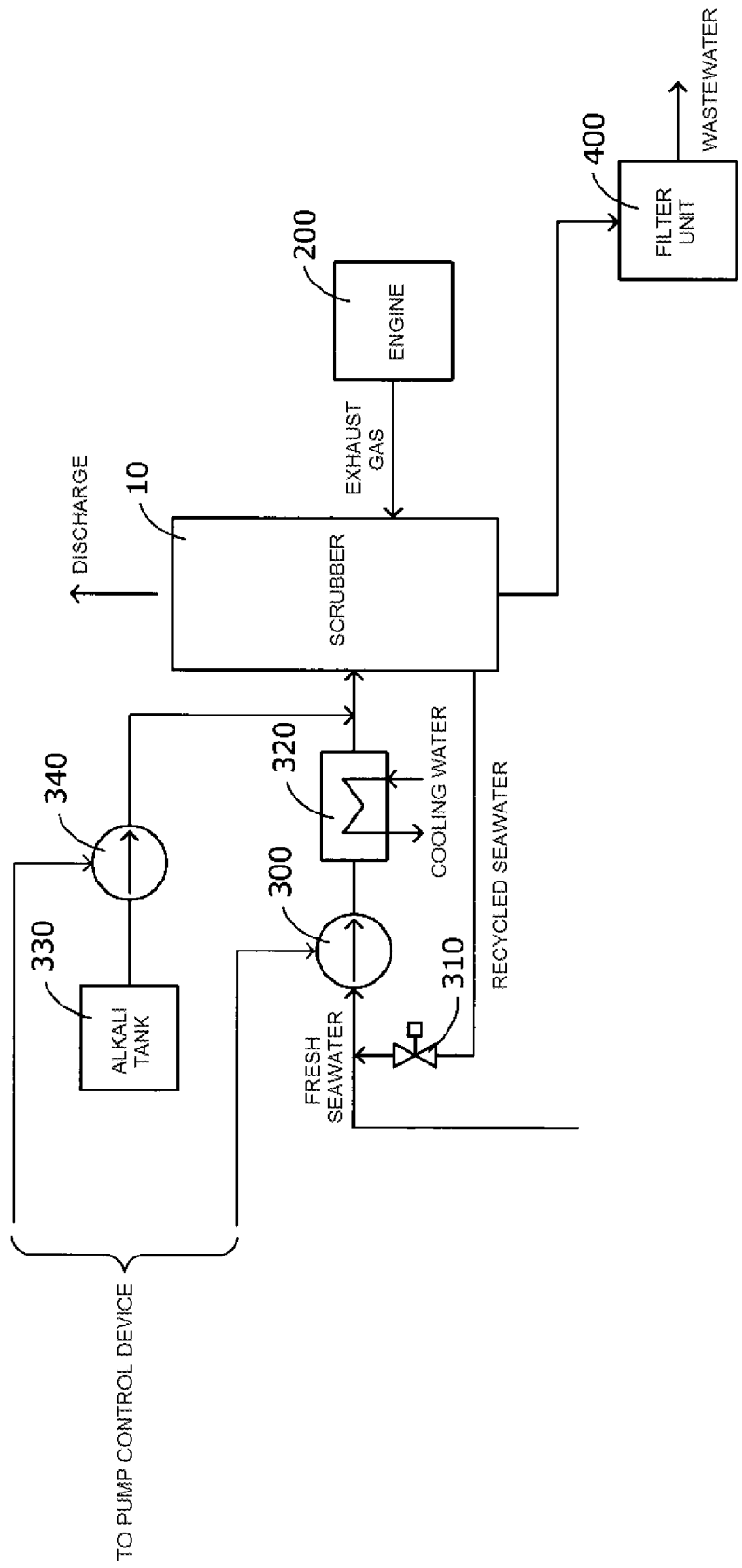
FIG. 8 is an illustrative diagram showing an exhaust gas processing system centered on a scrubber relating to a second embodiment.

FIG. 8 is an illustrative diagram showing an exhaust gas processing system centered on a scrubber relating to a second embodiment. As shown in FIG. 8, the exhaust gas processing system is principally configured by a scrubber 10 which receives a supply of exhaust gas from the engine 200, a seawater pump 300 which supplies seawater to the scrubber 10, and a filter unit 400 for filtering the wastewater discharged from the scrubber 10. The scrubber 10 is configured so as to be able to supply recycled seawater obtained by recycling seawater which has been used for purification, and fresh seawater which has not been used for purification.

The exhaust gas discharged from the engine 200 is introduced into the scrubber 10. This exhaust gas contains 50 to 1500 ppm of sulfur dioxide ($SO_2$). As this exhaust gas rises up inside the scrubber 10, seawater that has been introduced into the scrubber 10 via the seawater pump 300 is sprayed, and a gas-liquid contact is created.

A reaction proceeds as indicated in Formulas (1) to (3) in the first embodiment, and the exhaust gas from which sulfur dioxide ($SO_2$) has been removed is discharged into the atmosphere from the top of the scrubber 10.

The seawater sprayed inside the scrubber 10 drops down under its own weight along the inner circumferential surface of the scrubber 10, and collects in a collecting section below the scrubber 10. The collected seawater is discharged from the scrubber 10, and is then discharged into the sea after passing through the filter unit 400.

Depending on the waters being travelled by the ship, it may not be possible to discharge the seawater collected from the scrubber 10, into the sea, due to restrictions. In this case, the seawater collected in the collecting section of the scrubber 10 or in a separately provided tank is supplied back to the pump 300 via a recycling amount control valve 310, and is thereby used for exhaust gas processing in the scrubber 10.

The recycling amount control valve 310 is configured in such a manner that only fresh seawater is supplied to the seawater pump 300, when the valve is fully closed, and only recycled seawater is supplied to the seawater pump 300, when the valve is fully open. The degree of opening of the recycling amount control valve 310 is set so as to correspond to the amount of discharge water permitted in the waters where the ship is travelling. The amount of discharge water may be calculated from a previously obtained valve degree of opening and seawater pump capacity, or may be measured by providing a flow meter at the fresh seawater inlet.

The exhaust gas from the engine 200 has a high temperature of 200° C. to 400° C., and therefore the temperature of the recycled seawater is raised by absorbed heat from the exhaust gas. Therefore, recycled seawater which is supplied to the seawater pump 300 from the scrubber 10 via the recycling amount control valve 310 is cooled by cooling water in a heat exchanger 320, and is then supplied again to the scrubber 10.

Furthermore, the alkali component in the recycled seawater is consumed by absorption of sulfur dioxide ($SO_2$) in the scrubber 10. If the alkali component of the seawater is insufficient, then the reaction for absorbing the sulfur dioxide ($SO_2$) in the exhaust gas by the seawater is inhibited, and there is a risk that the sulfur dioxide ($SO_2$) concentration contained in the processed exhaust gas discharged into the atmosphere from the scrubber 10 may exceed the emission limit value.

Therefore, an alkali agent is injected from an alkali tank 330, via an alkali pump 340, into the recycled seawater which is supplied to the seawater pump 300 from the scrubber 10 via the recycling amount control valve 310, before the seawater is supplied again to the scrubber 10. Details of the control of the amount of alkali in this case are described below. A caustic soda (NaOH) solution may be used as the alkali agent.

The configuration of the scrubber 10 is the same as the scrubber 10 according to the first embodiment, apart from the fact that the spray apparatus 12 shown in FIG. 2 is connected to the seawater pump 300 and the gas supply apparatus 13 is connected to the engine 200, and therefore illustration and description thereof is omitted here.

As shown in FIG. 3, the further the amount of seawater supplied to the scrubber 10 is raised and the greater the amount of seawater sprayed by the spray apparatus 12, the greater the increase in the rate of removal of the sulfur dioxide ($SO_2$). This is because in addition to the increase in the contact surface area between the exhaust gas and the seawater due to increase in the surface area of the droplets when the amount of sprayed seawater is increased, the total amount of the alkali component contained in the seawater also increases.

Due to the relationship between the amount of seawater and the rate of removal of sulfur dioxide ($SO_2$) shown in FIG. 3, when the exhaust gas which is discharged into the atmosphere from the opening section 11c of the scrubber main body 11 contains a high concentration of sulfur dioxide ($SO_2$) (high outlet $SO_2$ concentration), then it is possible to reduce the outlet $SO_2$ concentration by increasing the amount of seawater sprayed by the spray apparatus 12.

Figure 9:
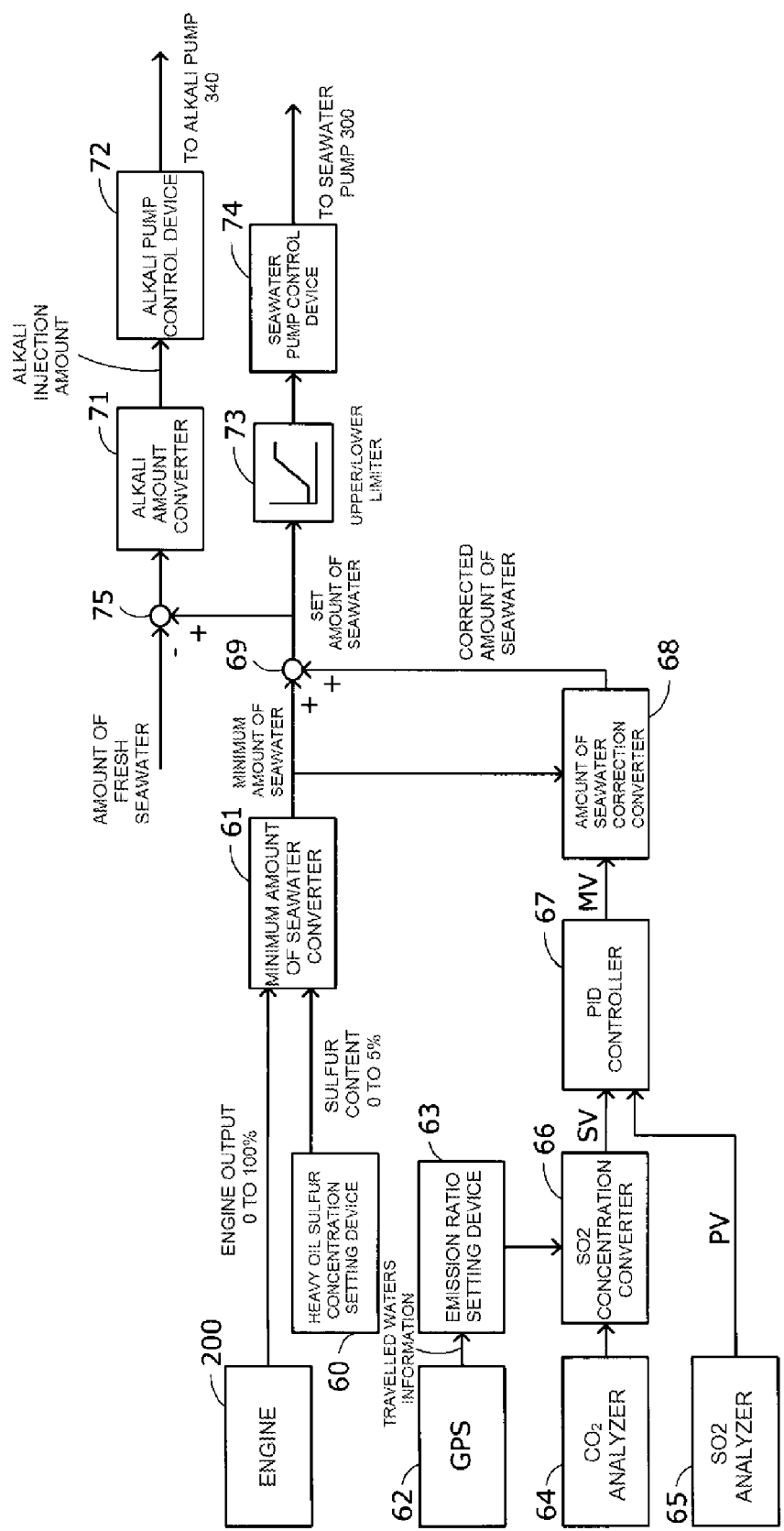
FIG. 9 is a block diagram showing the configuration of an amount of alkali control system in the exhaust gas processing system relating to the second embodiment.

There follows a description of the amount of alkali control in a case where an alkali agent is injected into the recycled seawater which is supplied to the spray apparatus 12 of the scrubber 10. FIG. 9 is a block diagram showing the configuration of an amount of alkali control system in the exhaust gas processing system relating to the present embodiment.

As shown in FIG. 9, this amount of alkali control system is provided with a heavy oil sulfur concentration setting device 60, a minimum amount of seawater converter 61, a GPS 62, an emission ratio setting device 63, an emission ratio setting device a $CO_2$ analyzer 64, a $SO_2$ analyzer 65, an $SO_2$ concentration converter 66, a PID controller 67, a seawater correction converter 68 and a summing element 69, similarly to the first embodiment, and in addition to this, is also provided with a summing and subtracting element 75, an amount of alkali calculator 71, an alkali pump control device 72, an upper/lower limiter 73, and a seawater pump control device 74.

The configuration and operation of the amount of alkali control system of this kind is described here. Configurations and operations which are the same as or similar to those of the first embodiment are not described here or are only described briefly.

The alkali control system is configured by a minimum amount of seawater converter 61 which calculates a minimum amount of seawater, an amount of seawater correction converter 68 which calculates a corrected amount of seawater, and an amount of alkali calculator 71 which calculates an alkali injection amount for injection into the recycled seawater on the basis of an amount of seawater corresponding to the difference between the set amount of seawater, which is the sum of the minimum amount of seawater and the corrected amount of seawater, and an amount of fresh seawater.

In the summing element 69, the set amount of seawater is calculated by summing the minimum amount of seawater calculated by the minimum amount of seawater converter 61, and the corrected amount of seawater calculated by the amount of seawater correction converter 68. Next, the amount of seawater corresponding to the difference obtained by subtracting the amount of fresh seawater from the set amount of seawater is calculated in the summing and subtracting element 75. The amount of seawater calculated by the summing and subtracting element 75 is input to the amount of alkali calculator 71.

The amount of alkali calculator 71 calculates an alkali component amount which is contained in seawater corresponding to the amount of seawater calculated by the summing and subtracting element 75, and also calculates an alkali injection amount corresponding to this alkali component amount. The alkalinity of seawater is 105 (ppm) when converted to a $CaCO_3$ value, or 105 (mg/l), and therefore if the amount of seawater is 100 (t/h), then the alkali component contained in the seawater corresponding to this amount of seawater is calculated to be 105 ($g/m^3$)×100($m^3$/h)=10500 (g/h)=10.5 (kg/h). Converting this to NaOH, the value is 8.4 (kg/h), and therefore the alkali injection amount when using 25(%) caustic soda solution having a specific gravity of 1.27 is calculated to be 8.4/0.25/1.27≅26.5 (l/h).

The amount of alkali calculator 71 outputs the calculated alkali injection amount to the alkali pump control device 72. The alkali pump control device 72 controls the alkali pump 340 and injects alkali agent corresponding to the alkali injection amount into the recycled seawater which is supplied to the scrubber 10.

Furthermore, the set amount of seawater calculated in the summing element 69 is input to the upper/lower limiter 73. The upper/lower limiter 73 specifies upper and lower limiter values for the amount of seawater supplied to the scrubber 10 via the seawater pump 300, and if the set amount of seawater which is input exceeds the upper limiter value, then this upper limiter value is output as the amount of seawater to be supplied to the scrubber 10. Similarly, if the set amount of seawater which is input exceeds the lower limiter value, then the upper/lower limiter 73 outputs the lower limiter value as the amount of seawater to be supplied to the scrubber 10. In other words, the upper/lower limiter 73 restricts the amount of seawater supplied to the scrubber 10, to a range between the upper and lower limit values.

In the present invention, the alkali component used to absorb and remove the sulfur dioxide ($SO_2$) in the exhaust gas does not depend only on the alkali component in the seawater, but rather a separate alkali agent can be injected, and therefore the amount of seawater supplied to the scrubber 10 can be maintained at an amount which enables absorption and removal of the sulfur dioxide ($SO_2$) in the exhaust gas by contact between the exhaust gas and the seawater, rather than an amount which compensates for the alkali component. Consequently, if the set amount of seawater exceeds the amount of seawater at which the sulfur dioxide ($SO_2$) in the exhaust gas can be absorbed and removed by contact between the exhaust gas and the seawater, then the amount of seawater is set to the upper limiter value, which is set as the amount of seawater to be supplied to the scrubber 10.

It is necessary to inject an amount of alkali such that the amount of alkali supplied to the scrubber 10 matches the amount of sulfur dioxide ($SO_2$) to be processed, and if the amount of alkali is insufficient, then the sulfur dioxide ($SO_2$) concentration in the exhaust gas exceeds the limit value, which is problematic. Therefore, by setting an upper limiter value and a lower limiter value for the amount of seawater supplied to the scrubber 10, by means of the upper/lower limiter 73, an amount of alkali which is proportionate to the difference between the set amount of seawater calculated by the summing element 69, and the amount of fresh seawater, is supplied, while reducing the power of the seawater pump 300, and therefore it is possible to supply an appropriate amount of alkali to the scrubber 10 and stable operation can be achieved.

The amount of seawater set by the upper/lower limiter 73 is input to the seawater pump control device 74. The seawater pump control device 74 controls the seawater pump 300 and supplies seawater of this amount to the scrubber 10.

The actual amount of seawater supplied from the seawater pump 300 to the scrubber 10 can be measured by installing a flow meter in the seawater pump 300. In this case, feedback control may be carried out, by comparing the actual amount of seawater measured by the seawater pump control device 74 with the set amount of seawater. However, even if the outlet $SO_2$ concentration in the scrubber 10 has risen due to an insufficiency in the amount of alkali supplied to the scrubber 10 from the seawater pump 300, the corrected amount of seawater is guided in an increasing direction by the PID controller 67 in the amount of alkali control system, and therefore the alkali injection amount is increased.

The pump for supplying seawater to the scrubber 10 may be a single pump or a plurality of pumps. If a plurality of pumps is provided, the plurality of pumps may be controlled by the seawater pump control device 74 in such a manner that the number of operating pumps is raised in accordance with increase in the set amount of seawater, and the number of operating pumps is reduced in accordance with decrease in the set amount of seawater (see FIG. 5).

When a plurality of pumps is controlled as shown in FIG. 5, in order to avoid frequent repetition of an operating state and a stopped state of the pumps, it is necessary for the PID controller 67 in the amount of alkali control system to be limited to proportionate control, in such a manner that integrated control is not carried out.

Furthermore, as shown in FIG. 10 and FIG. 11, it is also possible to adopt a configuration in which a plurality of pumps are controlled by an inverter in the seawater pump control device 74. In this case, it is possible to apply more precise pump control, compared to a case where control by an inverter is not implemented.

FIG. 10 is a block diagram showing a configuration of a case where the seawater pump control device 74 is provided with an inverter. For example, when two pumps for supplying seawater to the scrubber 10 are provided, as shown in FIG. 10, the seawater pump control device 74 is provided with a pump flow rate setting device 74*a*, the first inverter 74*b* and the second inverter 74*c*. The pump flow rate setting device 74*a* sets a flow rate per pump. The first inverter 74*b* controls the first pump 300*a*, and the second inverter 74*c* controls the second pump 300*b*.

FIG. 11 is a diagram showing a relationship between the flow rate set variable per pump and the set amount of seawater, according to the configuration shown in FIG. 10. In FIG. 11, a solid line indicates an operating state of a pump, and a broken line indicates a stopped state of a pump.

As shown in FIG. 11, when the set amount of seawater is between ($F_1$) and ($F_2$), only the first pump 300*a* operates, and the flow rate set variable of the first pump 300*a* gradually increases as the set amount of seawater increases from ($F_1$) to ($F_2$). When the set amount of seawater exceeds ($F_2$), then a second pump 300*b* also starts to operate. In this case, the flow rate set variable of the first pump 300*a* decreases with the operation of the second pump 300*b*. As the set amount of seawater increases from ($F_2$) to ($F_3$), the flow rate set variables in the first pump 300*a* and the second pump 300*b* progressively increase.

Furthermore, as the set amount of seawater decreases from ($F_3$), the flow rate set variables in the first pump 300*a* and the second pump 300*b* progressively decrease. When the set amount of seawater decreases below ($F_2$), then the second pump 300*b* stops operating. In this case, the flow rate set variable of the first pump 300*a* increases with the stopping of operation of the second pump 300*b*.

The control of the plurality of pumps by an inverter, which is illustrated in FIG. 10 and FIG. 11, is effective in cases where the possible values of the set amount of seawater are set to a broad range, in other words, cases where the range of the engine load variation and the range of sulfur content of the fuel oil are set to broad ranges, or the like.

As described above, according to the amount of alkali control system relating to the second embodiment, the alkali content required to neutralize the sulfur oxides (in particular, sulfur dioxide ($SO_2$)) contained in the consumed heavy oil is calculated as a minimum amount of seawater, from the engine output and the sulfur content in the heavy oil used, and moreover, a corrected amount of seawater is calculated in such a manner that the sulfur oxide concentration contained in the processed exhaust gas which is discharged into the atmosphere from the scrubber 10 does not exceed the emission limit value, and an alkali injection amount to be injected into the seawater is calculated on the basis of the set amount of seawater obtained by summing together the minimum amount of seawater and the corrected amount of seawater. By adopting this configuration, it is possible to control the alkali in the seawater supplied to the scrubber, without measuring the pH of the seawater, in other words, without using a pH meter, and therefore it is possible to obtain a stable and highly reliable rate of removal of the sulfur oxides.

Furthermore, according to the amount of alkali control system relating to the second embodiment, the sulfur dioxide ($SO_2$) concentration in the exhaust gas is controlled to within the limit values by respectively measuring the concentrations of carbon dioxide ($CO_2$) and sulfur dioxide ($SO_2$) in the exhaust gas, by the $CO_2$ analyzer 64 and the $SO_2$ analyzer 65. These analyzers yield more stable measurement results than a pH meter, and therefore by calculating the amount of alkali to be injected into the seawater on the basis of the measurement results from these analyzers, it is possible to obtain a stable and highly reliable rate of removal of the sulfur oxides.

The present invention is not limited to the embodiments described above, and can be implemented with various modifications. In the embodiments described above, the invention is not limited to the sizes and shapes, and the like, depicted in the accompanying drawings, and suitable modifications are possible within a range that exhibits the beneficial effects of the present invention. Apart from this, it is also possible to implement the invention by making suitable modifications, without departing from the object of the invention.

The present application is based on Japanese Patent Application No. 2013-014316 filed on 29 Jan. 2013 and Japanese Patent Application No. 2013-014317 filed on 29 Jan. 2013, the contents of which are incorporated herein in their entirety.

What is claimed is:

1. An amount of seawater control device for a scrubber, which controls an amount of seawater supplied to a scrubber that purifies sulfur oxide contained in exhaust gas from an engine by bringing the sulfur oxide into contact with seawater, comprising:
a minimum amount of seawater converter connected to the engine, the minimum amount of seawater converter being configured to
receive an engine output from the engine and an input indicating a sulfur content of fuel oil, and
calculate a minimum amount of seawater which is a minimum amount of seawater necessary for an absorption reaction of the sulfur oxide by the seawater, from the engine output, the sulfur content of fuel oil and a predetermined alkalinity of the seawater;
an amount of seawater correction converter connected to the minimum amount of seawater converter, the amount of seawater correction converter being configured to
receive the minimum amount of seawater from the minimum amount of seawater converter, and
calculate a corrected amount of seawater which is an amount of seawater at which the sulfur oxide contained in the exhaust gas discharged into atmosphere from the scrubber is equal to or less than a set variable based on a measured value of the sulfur oxide contained in the exhaust gas; and
a pump control device connected to the minimum amount of seawater converter and the amount of seawater correction converter, the pump control device being configure to control the amount of seawater supplied to the scrubber in accordance with a set amount of seawater that is a sum of the minimum amount of seawater calculated by the minimum amount of seawater converter and the corrected amount of seawater calculated by the amount of seawater correction converter.

2. The amount of seawater control device for a scrubber according to claim 1, further comprising a converter which calculates the set variable from a concentration of sulfur oxide contained in the exhaust gas discharged into the atmosphere from the scrubber, and an emission ratio of the sulfur oxide in waters being travelled.

3. The amount of seawater control device for a scrubber according to claim 2, further comprising a PID (proportional, integral and derivative) controller that connects the converter to the amount of seawater correction converter, the PID controller being configured to
receive the set variable from the converter,
calculate by PID a deviation between the set variable and the concentration of the sulfur oxide contained in the exhaust gas discharged into the atmosphere from the scrubber, and
supply a manipulative variable to the amount of seawater correction converter.

4. The amount of seawater control device for a scrubber according to claim 1, further comprising a pump connected to the pump control device, wherein the pump control device has
a plurality of inverters, and
a pump flow rate setting device which starts and stops operation of the pump by the plurality of inverters, and changes a flow rate of the pump, in accordance with the set amount of seawater.

5. The amount of seawater control device for a scrubber according to claim 1, further comprising:
an amount of alkali calculator which calculates an alkali injection amount from an amount of an alkali component which is contained in seawater corresponding to the set amount of seawater; and
an alkali pump control device which implements control in such a manner that an alkali agent corresponding to the alkali injection amount is injected into the seawater which is supplied to the scrubber.

6. The amount of seawater control device according to claim 5,
wherein the scrubber is configured so as to be able to supply recycled seawater obtained by recycling seawater which has been used for purification, and fresh seawater which has not been used for purification,
the amount of alkali control device further comprises a summing and subtracting element which calculates an amount of seawater corresponding to a difference obtained by subtracting an amount of fresh seawater from the set amount of seawater, and the amount of alkali calculator calculates an alkali injection amount from an amount of an alkali component which is contained in seawater of the amount corresponding to the difference.

7. The amount of seawater control device according to claim 5, further comprising an upper and lower limiter which restricts the amount of seawater supplied to the scrubber to within a range between upper and lower limit values.

8. The amount of seawater control device according to claim 5, further comprising a converter which calculates the set variable from a concentration of sulfur oxide contained in the exhaust gas discharged into the atmosphere from the scrubber, and an emission ratio of the sulfur oxide in waters being travelled.

9. The amount of seawater control device according to claim 5, further comprising a pump connected to the pump control device, wherein
the pump control device has a plurality of inverters, and
a pump flow rate setting device which starts and stops operation of the pump by the plurality of inverters, and changes a flow rate of the pump, in accordance with the set amount of seawater.

10. The amount of seawater control device for a scrubber according to claim 2, further comprising a pump connected to the pump control device, wherein the pump control device has a plurality of inverters, and a pump flow rate setting device which starts and stops operation of the pump by the plurality of inverters, and changes a flow rate of the pump, in accordance with the set amount of seawater.

11. The amount of seawater control device according to claim 6, further comprising an upper and lower limiter which restricts the amount of seawater supplied to the scrubber to within a range between upper and lower limit values.

12. The amount of seawater control device according to claim 6, further comprising a converter which calculates the set variable from a concentration of sulfur oxide contained in the exhaust gas discharged into the atmosphere from the scrubber, and an emission ratio of the sulfur oxide in waters being travelled.

13. The amount of seawater control device according to claim 6, further comprising a pump connected to the pump control device, wherein the pump control device has a plurality of inverters, and a pump flow rate setting device which starts and stops operation of the pump by the plurality of inverters, and changes a flow rate of the pump, in accordance with the set amount of seawater.

\* \* \* \* \*